United States Patent
Aldworth et al.

(10) Patent No.: US 11,836,818 B2
(45) Date of Patent: Dec. 5, 2023

(54) SYSTEM AND METHOD FOR MULTI-INSTITUTIONAL OPTIMIZATION FOR A CANDIDATE APPLICATION SYSTEM

(71) Applicant: OCAS, Guelph (CA)

(72) Inventors: Michael Aldworth, Guelph (CA); Jeffrey Glassford, Kitchener (CA); Wayne Edward Jason Hesch, Waterloo (CA); Darren Mackenzie O'Shea, Kitchener (CA); Marc Andrew Provencher, Guelph (CA); Shawn Maurice Robinson, Cambridge (CA); Alisha Sanghera, Burlington (CA); Kevin Michael Schneider, Wyoming (CA); Tudor Alexander Whiteley, Puslinch (CA); Michael Arman Williamson, Guelph (CA)

(73) Assignee: OCAS

( * ) Notice: Subject to any disclaimer, the term of this patent is extended or adjusted under 35 U.S.C. 154(b) by 883 days.

(21) Appl. No.: 16/286,720

(22) Filed: Feb. 27, 2019

(65) Prior Publication Data
US 2020/0273127 A1    Aug. 27, 2020

(51) Int. Cl.
G06Q 50/20    (2012.01)
G06Q 20/02    (2012.01)
G06Q 30/0282    (2023.01)
H04L 67/306    (2022.01)

(52) U.S. Cl.
CPC ......... *G06Q 50/2053* (2013.01); *G06Q 20/02* (2013.01); *G06Q 30/0282* (2013.01); *H04L 67/306* (2013.01)

(58) Field of Classification Search
CPC ............... G06Q 50/2053; G06Q 20/02; G06Q 30/0282; H04L 67/306
USPC ........................................................ 705/327
See application file for complete search history.

(56) References Cited

U.S. PATENT DOCUMENTS

| | | | | |
|---|---|---|---|---|
| 2006/0265258 A1* | 11/2006 | Powell | ................... | G06Q 10/10 705/327 |
| 2009/0083048 A1* | 3/2009 | Mandelbaum | ......... | G06Q 10/10 705/1.1 |
| 2009/0299993 A1* | 12/2009 | Novack | .............. | G06Q 30/0601 707/999.005 |

(Continued)

OTHER PUBLICATIONS

Paul Schulmann et al., "Navigating A New Paradigm For International Student Recruitment", Jun. 2018, Report 10, New York: World Education Services. Retrieved from wes.org/partners/research/ (Year: 2018).*

(Continued)

*Primary Examiner* — Sangeeta Bahl
*Assistant Examiner* — Joshua D Schneider

(57) ABSTRACT

A system and/or method can be provided for optimizing data-sharing in a multi-institutional application system using, where appropriate, semi-blind data-viewing in a semi-cooperative context. A method for evaluating agent quality, individual student success probability, and sharing these evaluations among a plurality of applicants to a plurality of academic programs while retaining the confidentiality of individual applicants is shown. Multiple parameters both immediate and historic are used to evaluate agent quality and individual student success probability.

11 Claims, 4 Drawing Sheets

(56) References Cited

U.S. PATENT DOCUMENTS

| | | | | |
|---|---|---|---|---|
| 2010/0057500 | A1* | 3/2010 | Lim | G06Q 40/08 705/40 |
| 2011/0302294 | A1* | 12/2011 | Oostlander | G06F 11/3409 709/224 |
| 2014/0040156 | A1* | 2/2014 | Carroll | G06Q 50/20 705/327 |
| 2014/0101735 | A1* | 4/2014 | Drenkard | G06Q 10/10 726/6 |
| 2016/0006875 | A1* | 1/2016 | Burmeister | H04M 3/5158 379/265.06 |

OTHER PUBLICATIONS

Ashley Marie Sansotta, "Measuring ROI in international student recruitment", Jul. 13, 2016, Retrieved from https://www.eaie.org/blog/measuring-roi-international-student-recruitment.html (Year: 2016).*

Rahul Choudaha, "Assessing the Effectiveness of International Student Recruitment", 2017, In Sandberg, Jessica Black (Ed.), NAFSA's Guide to International Student Recruitment, 3rd Ed (pp. 245-252). Washington, DC: NAFSA: Association of International Education. (Year: 2017).*

* cited by examiner

SYSTEM AND METHOD FOR MULTI-INSTITUTIONAL OPTIMIZATION FOR A CANDIDATE APPLICATION SYSTEM

CROSS REFERENCE TO RELATED APPLICATIONS

The application claims priority to and the benefit of U.S. patent application Ser. No. 16/286,676, entitled "SYSTEM AND METHOD FOR ACHIEVING CANDIDATE DIVERSITY IN A CANDIDATE APPLICATION SYSTEM", filed on Feb. 27, 2019, the disclosure of which is incorporated herein by reference in its entirety.

BACKGROUND

The embodiments described herein relates to candidate application systems and more particularly, to a system and method for multi-institutional optimization of the candidate application system for supporting post-secondary education institutions.

In a post-secondary institution application system soliciting applications from internationally-located candidates, an agency model is often employed, to ease the application process. In this model, agencies local to applicants work directly with institutions or application centres, and submit applications on behalf of the applicants.

In a multi-institutional application system, where institutions compete for both applicants and funding, and also co-operate in their offerings of programs, it is beneficial for institutions, as well as the overall system, to have a centralized system for receiving applications, receiving data from institutions, and aggregating and analyzing this data. As the institutions both compete and co-operate, some data needs to be held independently and made available to other institutions only as aggregated or otherwise anonymized data. This data sharing allows better co-operation between the institutions in dealing with agencies, and allows better targeting of applicants for programs, in a way that reduces agency fee payouts overall, improves agency quality through fee incentives for better agency performance, and improves applicant success and maximizes enrollment by ensuring applicants are placed in best-suited programs and institutions.

SUMMARY

Systems and methods are provided herein for optimizing data-sharing in a multi-institutional application system using, where appropriate, semi-blind data-viewing in a semi-cooperative context.

A method for evaluating agent quality, individual student success probability, and sharing these evaluations among a plurality of applicants to a plurality of academic programs while retaining the confidentiality of individual applicants is shown. Multiple parameters both immediate and historic are used to evaluate agent quality and individual student success probability.

Thus, the systems and/or methods described herein can help optimize a multi-institutional application system through reducing costs and improving enrollment. Other features and advantages of the systems and/or methods are described more fully below.

DETAILED DESCRIPTION

Figure 1:
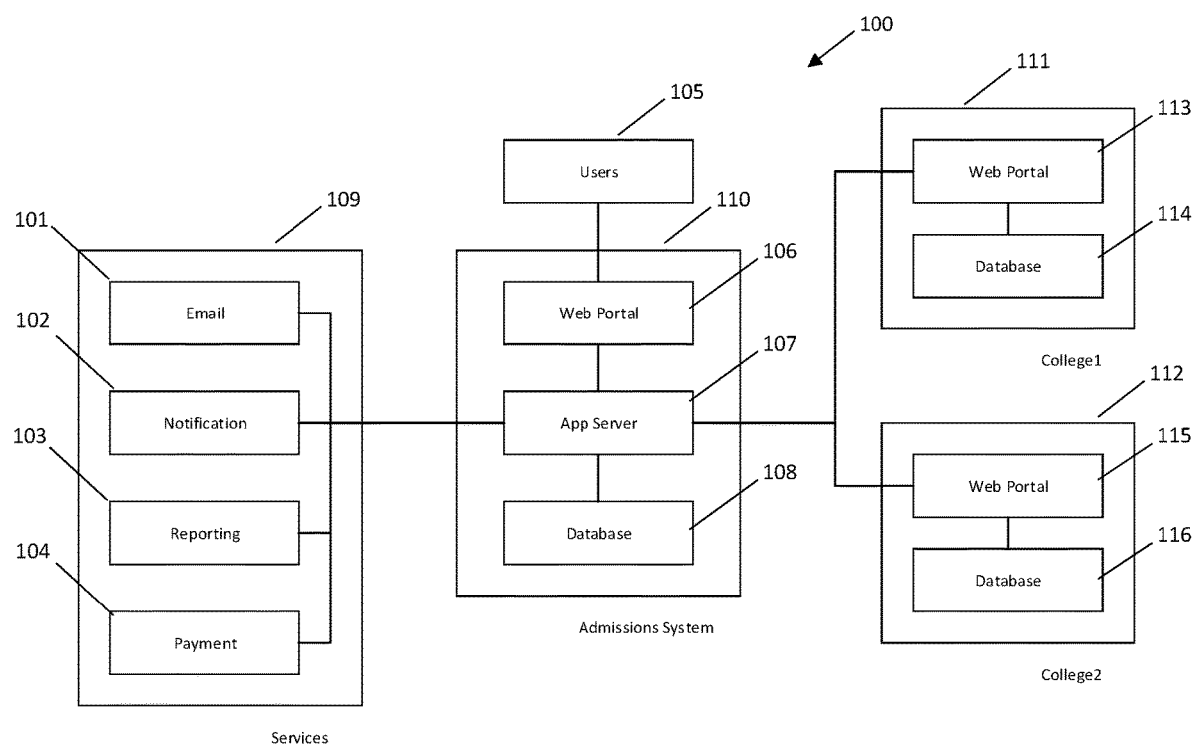
FIG. 1 is a system diagram illustrating an exemplary candidate application system.

The system comprises a student application system with agency, administrative and institutional interfaces; a subsystem for receiving applications from agencies, a subsystem for receiving and storing statistics and feedback from institutions, and a subsystem for storing and correlating application information and institutional information. The phrase "educational institution" may include a vocational college, a public or private college, a public or private university or a trade school. The phrase "post-secondary" refers to further education above and beyond secondary school and or high school. It may be understood that the present application may be applied to any institution's application system, including non-post-secondary educational institution application systems.

System for Evaluating and Handling Agent Quality

There are various measures of agency quality, relating to performance on behalf of applicants as well as the institutions. For example, one agency may frequently fill out application forms incorrectly: this may delay processing of the application and require resubmission, which may be a burden for both the application centre as well as the applicant. Another agency may recommend that applicants apply to many programs for which the applicant may not be well qualified; while this approach may appear favourable to the applicant, it does not improve their chances of admission and burdens the application system with additional applications.

It is therefore to the advantage of an application system to identify and incentivize factors which improve application quality from agencies, as this would lead to less of a burden on the application system, as well as improve certainty and lower cost for applicants.

The present disclosure makes use of and extends an existing student success tracking system to create appropriate incentives for agents, by correlating various measures of student success with their initiating agency.

The disclosure comprises a computer system which implements a storage mechanism for data, a computational mechanism for scoring and at least one user interface.

An implementation of this disclosure may make use of one or various measures of agency quality, such as:

Historical applicant success rate for applicants from this agency, or a measure of number or percentage of successful applications which reach a given stage of the application pipeline, from initial application to acceptance by a post-secondary institution to enrollment to completion of the first semester to graduation from the program to finding employment in a relevant industry;

Historical application-program continuity rate for applicants from this agency, meaning a measure of what percentage of accepted students from a given agency do not switch programs of study upon beginning their studies—scoring low on this metric may indicate that an agency is deliberately encouraging lower-quality applicants to apply to programs with lower admission standards which may be unrelated to the applicant's desired program, with the intention of the applicant switching into the desired program once the course of study begins;

Applicant English proficiency scores;

Total number of applicants—this metric may be positively correlated with agency quality in the view of institutions which charge per application; but may be negatively correlated in the view of institutions which do not, and which therefore have more applications to process;

Application formal quality, which may itself be measured through incidence of transcript or English score fraud, through application completeness or the incidence of an institution needing to request supplementary materials which should have been included with the application, through incidence of application errors, or through any other measure or measures of application formal quality;

Agency satisfaction ratings provided by applicants to an institution, to a third-party rating agency, or to any other organization which may wish to evaluate applicant satisfaction with an agency;

An agency's certification or lack thereof, which certification may be a government certification; or Any other metric by which the performance of an agency may be measured.

An implementation may calculate these metrics per agency and store them centrally. The aggregate metrics (measured per applicant) may be averaged or weighted-averaged across all or some applicants who made use of that agency. The summed metrics (measured in total) may be tallied per agency. The inverse or complement of one or more metrics may be used, where a higher score is less desirable. Weightings may be applied per metric. An agency score may then be calculated; one method would be to simply sum the weighted values of the metrics.

Any subset of the metrics used may be in turn used to calculate a subscore; this may be useful if, for example, one of the metrics is not deemed important for a particular scoring purpose, or if there is some question about what effect a particular metric may be having on a score. A subset consisting of at least a single metric may also be used to create a subscore.

The underlying data for the agency metrics may be directly input via the institutional user interface, may be entered through an application processing system, may be automatically generated through analysis of how applications are handled and flagged by client institutions, or may be input or imported through some other means.

Institutional User Interface

Preferably, the system will present a user interface for client institutions. This interface may display metrics of agency quality in way which allows for comparison of one agency against another, whether by overall score or by subscore. The interface may display a time series of agency score or subscore, per agency. The interface may display an aggregation of agency scores or subscores by geographic region, by commission paid to the agency, or by any other natural or arbitrary grouping of agencies. When displaying these aggregations, the user interface may show one aggregate group's scoring against another groupings, or may highlight one or more agencies' scoring as compared to the group to which they belong.

Client institutions may wish to keep confidential the list of agencies with whom they are associated. However, the aggregation of data across multiple institutions may showcase trends or data-points which may not be immediately evident from the data of a single institution. In light of these factors, preferably the system may, for each client institution, automatically aggregate and obfuscate the data from other institutions, while leaving data from the client institution unobfuscated; this aggregation would be performed automatically depending on the identity of the client institution logged into the system.

Institutional Feedback

Client institutions may understand that it is to the benefit of all institutions if lower-quality agencies are identified. To this end, the system may implement a user interface which allows institutions to comment on or provide an institutional score for any given agency. The institutional score for a given institution for any agency may be displayed as one of the metrics, and may be anonymized to prevent identification of the scoring institution; the institutional scores for an agency may be weighted together or aggregated to provide an overall institutional score for the agency.

Institutions may place one or more agencies on hold—that is, may temporarily or permanently stop accepting applications from those agencies—based on factors such as low-quality applicants or higher than average incidence of fraud. The institutional feedback user interface may allow institutions to indicate that a particular agency has been placed on hold.

Institutions may use outcome tracking to determine fees or other compensation paid to agencies. For example, an agency which consistently submits successful applicants may earn higher fees based on a higher agency score.

Automated Queries

An implementation of this disclosure may implement a system for automated queries of agency score. The queries may come from institutions, or from with a student application system, and may be associated with particular applications as those applications are received from an agency.

This facility may be used to weight individual applications. The application as a whole may be weighted with a score derived from the metrics of the agency through which the application was submitted, or a portion of the application may be weighted or flagged as a result of a score or subscore of its originating agency. Additionally, specific actions may be taken on a specific application, depending on the scoring of its originating agency.

As an example, an application may be received from an agency which has traditionally had a higher than average incidence of English proficiency test score fraud. If English proficiency test score fraud is a metric by which this agency has been scored, this application may be scored appropriately and may be ranked lower than an application received from any agency which has an average incidence of such fraud. Alternatively, the application may be flagged to indicate a potentially higher likelihood of test score fraud, in a dedicated field on the application as the institution would receive it, in a human-readable notice in an appropriate location on the application, or in some other way.

In another example, an application may be received from an agency which has traditionally submitted only very high quality applications from high quality candidates. The application system may then query the agency scoring system and receive a very high score for the agency. If the application shows outstanding grades for the applicant, then, coupled with the high score for the agency, the application system may automatically generate an offer for the applicant, or may flag the application in some way as being a high quality application.

The application system may also compare the score of a particular agency with the scores of other agencies, to facilitate the ranking of agencies and to automatically detect whether the fees paid to an agency are higher or lower than the fees paid to similarly-ranked agencies. Such a disparity may be flagged to an educational institution or to the administrators of the application system.

Centralized Tracking of Applicant Outcomes

In some situations, post-secondary institutions have an interest in or mandate to work co-operatively to optimize student success, as measured by any number of metrics. For example, a college X in one area may be attractive to international applicants from a certain, because the local population around college X may have a higher than average proportion of immigrants from that region. Another college Y, in another area, may offer a similar program, but in an area without an immigrant population. If both colleges act independently, student success, as measured by graduation rate, may be lower overall than if the colleges were to act in concert to boost student success. For example, some international students from the noted region, attending a college other than college X, may not find the community support they need to succeed, and do not graduate, where they would have found success had they attended college X—the selected college then loses the upper-year revenue as this student's seat goes empty. Additionally, if the intake rate at college X doesn't meet demand, the entire post-secondary network in question may lose out on some international applicants who, not being able to attend college X, may opt for attending school in a different post-secondary network or may not pursue higher education at all—the network then loses the opportunity to educate this applicant, as well as the concomitant revenue.

This fact has tremendous ramifications for example in public funding of post-secondary education, as higher student success, and lower jumper rates (proportion of enrolled students not attending any classes) and melt rates (proportion of enrolled students attending fewer than ten days of classes), may significantly decrease the cost of delivering some programs.

The present disclosure implements a system which centrally tracks student success for a post-secondary institution network, and allows for inter-institutional trading of seats, students or programs. The system comprises a computer system which implements a storage mechanism for data and at least one user interface. Preferably, the system acts in concert with or as part of an educational institution application system, such that applications may be stored and relevant data need not be re-entered.

An implementation may connect directly to a client institution's student database, such that student success information may be transferred directly to this system. An implementation may present a user interface which allows student information to be input directly or may directly-transferred information to be overridden; such a user interface may supplement or replace the direct connection to the institution's student database.

Preferably, an implementation may correlate the student information from the institution's student database to the information from the student's initial application, which latter information may include country of origin, applying agency, English proficiency score, educational institution evaluations such as grades, prior work experience, desired institution, desired program, or any other information which may form part of the application process. Information from the institution's student database may include current program, institution, course grades, graduation information, post-graduate employment information, work placement information, or any other information which may form part of a student's file.

The user interface presented to client institutions may be able to calculate or show correlations between any of the information factors present, in a multivariate fashion. For example, the user interface may be able to show what proportion of students from a given region have graduated, per institution, or what proportion of applicants from a given region have a higher than average jumper rate, or what proportion of students from a particular agency have found work in their field 6 months after graduation.

As some institutions may prefer that their data be kept confidential, the client institution user interface may selectively aggregate or obfuscate the data from a given institution when viewed by another institution, to prevent identification of data from a specific institution. As some institutions may wish to share data with one another, the user interface may selectively aggregate or obfuscate the data only from certain institutions, while leaving the data from other institutions viewable.

The system may be configured to process certain metrics across institutions and identify anomalies, such as a higher than average graduation or jumper rate for applicants/students from a particular region. This facility may allow institutions to ascertain their relative strengths and weaknesses as related to these correlations, and either make changes within their institutions to address issues, or, if so determined, limit enrollment from applicants whom they are not appropriately equipped to support.

As well, the system may be configured to calculate and suggest appropriate seat trades, that is, exchanges of increased enrollment at one institution X for a particular set of applicants to a particular program, essentially traded for another institution Y decreasing enrollment for a similar set of applicants. Similar exchanges with other institutions within a given post-secondary network may be feasible such that the total number of program spaces (seats) within the network is not changed, but each seat is filled with an applicant who is more likely to succeed in their program.

FIG. 1 shows a system diagram of the system herein described. The system 100 consists of four main functional components: Users 105, Services 109, Admissions System 110, and Colleges represented as College1 111 and College2 112. The User 105 communicates to the Admissions System 110 through the Web Portal. The web portal manages the tasks required to prompt the user for information, and to receive this information. The portal may be implemented in one of several well known technologies, such as a web based application, a PC or mobile device application, a terminal application, or other data entry system.

The information collected in the Web Portal 106 is stored on the App Server module 107. The App Server 107 is also connected to the Database 108 that stores the information input by the Users 105 in a non-volatile manner. Depending on several factors, including the information input by the User 105, time, and information from other sources in the system such as the Colleges 111 and 112, the App Server 107 may calculate that additional actions are required, such as one of the Services 109. The Services 109 are represented as functional blocks that can initiate various actions.

The App Server 107 communicates with the Email 101 module, initiating an email. The App Server 107 also communicates with a Notification 102 module, initiating a notification to other users of the system. These notifications may include notifications such as system status changes, or the opening and closing of application windows, or notifications of upcoming events.

The App Server 107 communicates with the Payment 104 module when payment events are required. This may include prepayment of application fees, government fees, admission fees, fees held in escrow for assurance of future actions, or other types of fees. The Payment module reports the status of payment activity to the App Server 107 for further processing. The Colleges access the system in a manner similar to the Users 105, but have access to different and additional data. For example, College1 111 has a Web Portal interface 113.

This interface is also connected to a Database 114 that stores local copies of the information from the system in addition to being able to store information from additional sources within the college. This permits the college to combine information from the Admissions System 110 with local college information to create insights that can be used to competitive advantage. Similarly, College2 112 has a Web Portal interface 115.

This interface is also connected to a Database 116 that stores local copies of the information from the system in addition to being able to store information from additional sources within the college. This permits the college to combine information from the Admissions System 110 with local college information to create insights that can be used to competitive advantage. The information that can be used to create competitive intelligence include number of applicants, location of applicants, academic record of applicants, extra-curricular activities of applicants, spoken language of applicants, and other information. This can be combined with conversion rate, success rate, agency quality, applicant quality, the success of previous applicants with similar profiles, or other measures.

Figure 2:
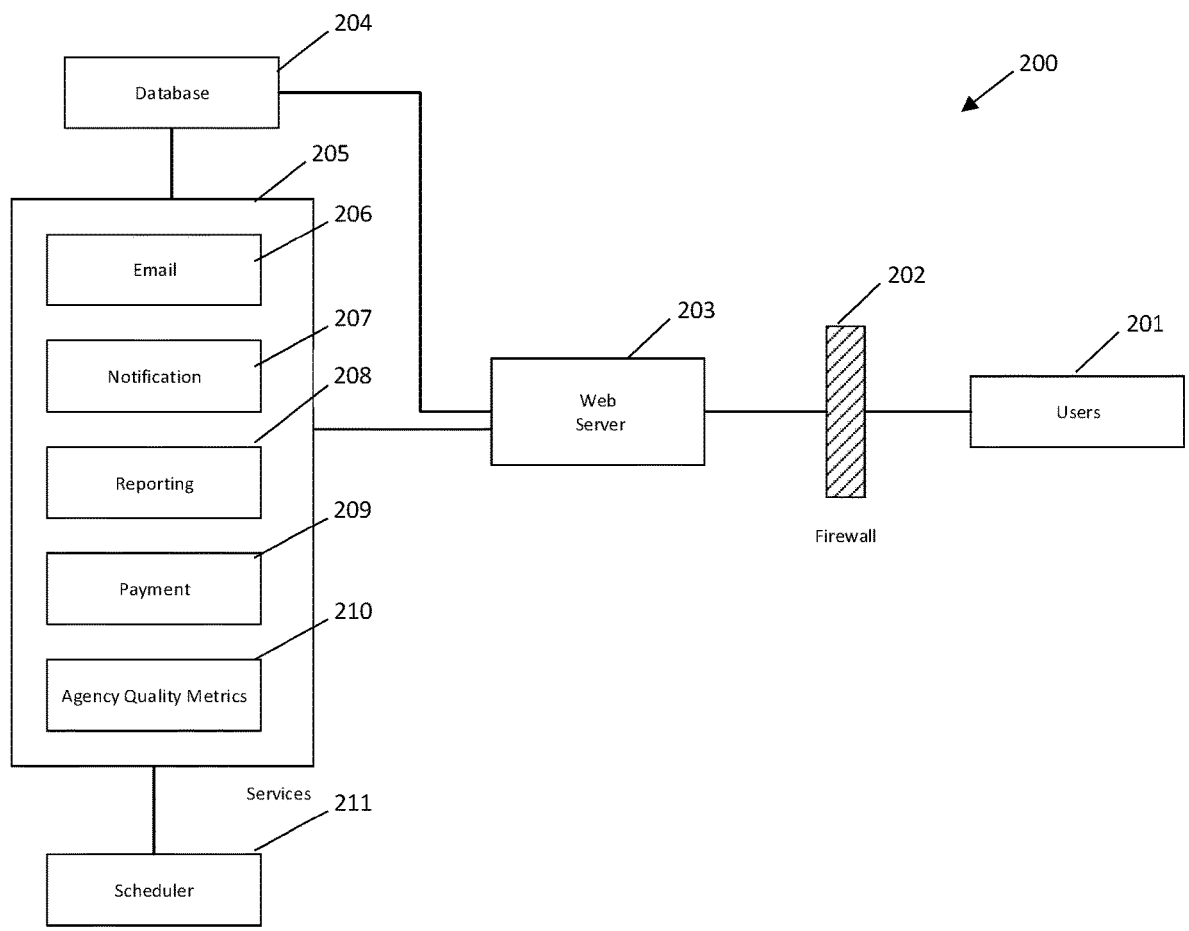
FIG. 2 is an interconnection diagram further illustrating an exemplary candidate application system.

FIG. 2 illustrates a connection diagram for the hardware and software module components of the implementation. The system 200 is comprised of various modules that enable a user to interact with the system. A User 201 communicates through firewall 202 to the Web Server 203. The Firewall 202 provides protection against unauthorized access and malicious attacks to the system.

The Web Server 203 hosts the user interface that manages the tasks required to prompt the user for information, and to receive this information. The Web Server 203 is connected to the Database 204, and stores the information input by the Users 201 in a non-volatile manner. The Web Server 203, the Database 204, and the Scheduler 211 work in conjunction to initiate activities in the Services module 205.

The Services 109 are represented as functional blocks that can initiate various actions. The Web Server 203, the Database 204, and the Scheduler 211 communicate with the Email 206 module, initiating an email. The Web Server 203, the Database 204, and the Scheduler 211 module also communicate with a Notification 207 module, initiating a notification to other users of the system. These notifications may include notifications such as system status changes, or the opening and closing of application windows, or notifications of upcoming events.

The Web Server 203, the Database 204, and the Scheduler 211 communicate with the Payment 104 module when payment events are required. This may include prepayment of application fees, government fees, admission fees, fees held in escrow for assurance of future actions, or other types of fees. The Payment module stores the record of payment activity in the Database 204. Web Server 203, the Database 204, and the Scheduler 211 are connected to the Agent Quality Metrics module 210.

The Agent Quality Metrics 210 module may, for example, algorithmically calculate an agent quality metric based on historical applicant success rate, historical application-program continuity rate, applicant English proficiency scores, total number of applicants, application formal quality, agency satisfaction ratings, agency's certification, or other metrics. These windows may be recorded in the Database 204, and used to modify the available options on the Web Server 203.

Figure 3:
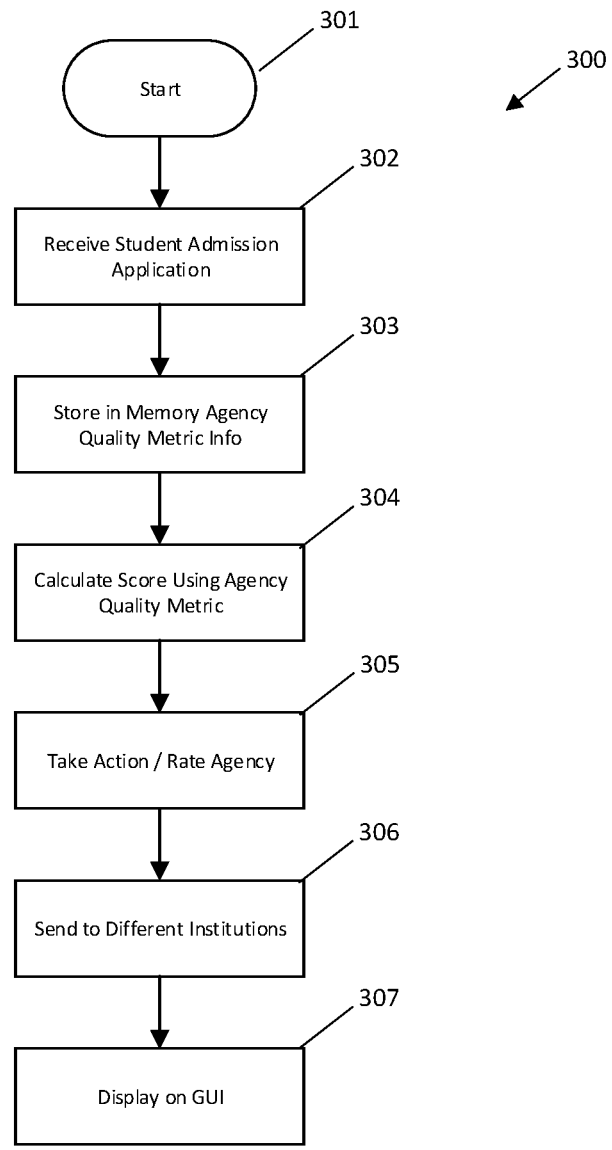
FIG. 3 is a flow chart illustrating a method of multi-institutional optimization of an exemplary candidate application system.

FIG. 3 is a flow chart illustrating a method of multi-institutional optimization of an exemplary candidate application system. Starting at method step 301, the system receives a Student Application 302. Aspects of the application, factors related to the application and other student application information, such as, but not limited to, agency location, transcript reliability, language proficiency score reliability and application completeness are stored in memory 303. This data is correlated with the data stored at 303 when previous applications from the same agency were submitted through this system.

At step 304, an agency score is calculated based on some or all of the factors stored at step 303, from at least one of the applications submitted through the system. This score may be calculated automatically each time an application is submitted through the system, may be calculated manually when a user directly or indirectly requests a recalculation or report, or some combination of these approaches. If there is a fee paid to the agencies, this fee may be at least in part calculated on or derived from the agency score.

When an agency's score is recalculated, the system may take action on the new score or on the difference between the previous score and the new score, such as, but not limited to, generating a notification, generating a report, preventing new applications from an agency or allowing new applications from an agency 305. The notification, report, or other output from 305 is sent to one or more users 306, who may be at one or more institutions or organizations. The output may then be displayed on a user interface 307. The action of displaying on the user interface or other notification actions may be either a push type action or pull type action. A push type action enables automatic recalculation and a pull type action enables the report to be created upon request.

Figure 4:
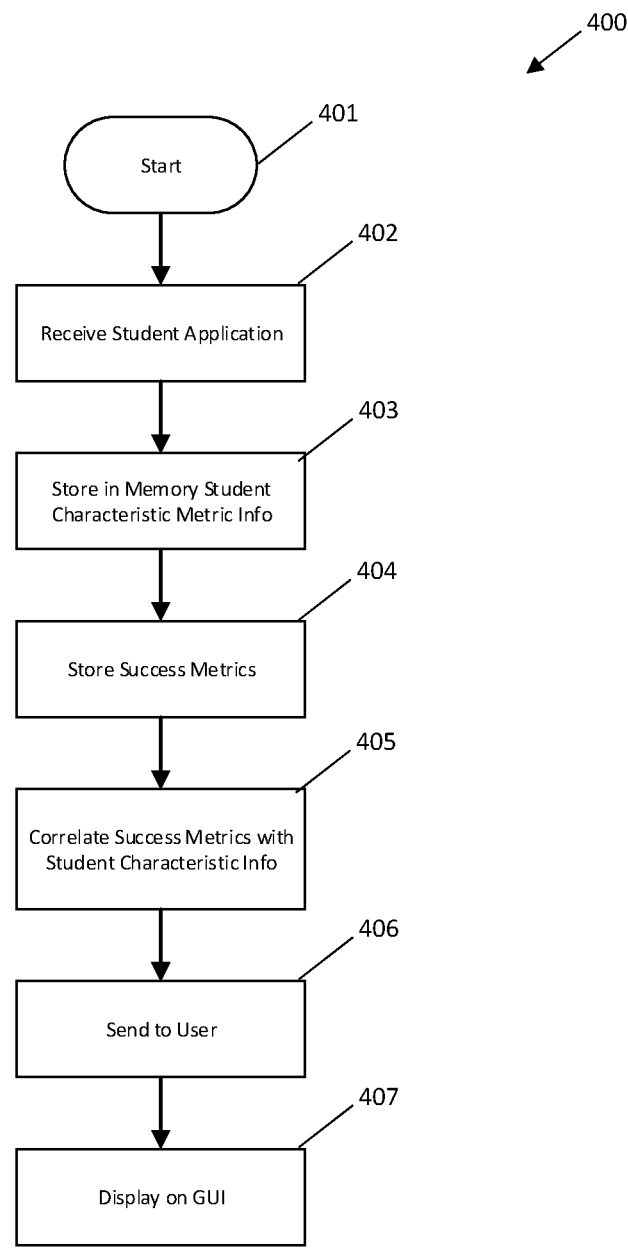
FIG. 4 is a flow chart illustrating a further method of multi-institutional optimization of an exemplary candidate application system.

FIG. 4 is a flow chart illustrating a further method of multi-institutional optimization of an exemplary candidate application system. Starting at step 401, the system receives a student application 402. The systems stores into memory Characteristic Metric information about the student, such as, but not limited to, place of origin, language proficiency scores, native language, previous work experience, work history, program and educational institution 403.

As the student progresses through the system and eventually leaves the system, Student Success Metrics are received from educational institutions and stored by the system correlated to the Characteristic Metric information for the same student, the Student Success Metrics being such factors as, but not limited to, grades, test performance, self-reported satisfaction with the program, status of graduation, or status of post-graduation employment at step 404.

When a user directly or indirectly requests a correlation report, the system correlates the Success Metrics with the Characteristic Metrics, with the relevant factors for each set of metrics specified by the user at step 405. The report or correlation information is generated and sent to one of more users at step 406, who may be at one or more institutions or organizations. Correlations are well known mathematical functions that indicate similarity between different data or sets of data. Correlation calculations also frequently express the confidence intervals: a measure of confidence that the data sets are similar. Finally, the output may then be displayed on a user interface at step 407.

While various embodiments have been described above, it should be understood that they have been presented by way of example only, and not limitation. Where schematics and/or embodiments described above indicate certain components arranged in certain orientations or positions, the arrangement of components may be modified. While the embodiments have been particularly shown and described, it will be understood that various changes in form and details may be made.

Although various embodiments have been described as having particular features, concepts, and/or combinations of components, other embodiments are possible having any combination or sub-combination of any features, concepts, and/or components from any of the embodiments described herein. The specific configurations of the various components can also be varied. For example, the specific size, specific shape, and/or specific configuration of the various components and/or various inputs or outputs can be different from the embodiments shown, while still providing the functions as described herein. The size, shape, and/or configuration of the various components can be specifically selected for a desired or intended usage.

Where methods and/or events described above indicate certain events and/or procedures occurring in certain order, the ordering of certain events and/or procedures may be modified and that such modifications are in accordance with accepted and/or desired variations of the specific embodiments. Additionally, certain events and/or procedures may be performed concurrently in a parallel process when possible, as well as performed sequentially as described above. Certain steps may be partially completed or may be omitted before proceeding to subsequent steps.

What is claimed:

1. A computer-implemented method of evaluating agent quality of at least one admission application from at least one agent of at least one admission applicant by way of a multi-institutional application system configured to operate via a set of executable instructions storable in relation to a non-transient memory, the method comprising, using the system:
receiving, by the multi-institutional application system and from at least one agent, the at least one admission application;
storing information, in the memory of the multi-institutional application system, pertaining to two or more agent quality metrics, in relation to the memory;
automatically calculating, by a processor of the multi-institutional application system, a score using the two or more agent quality metrics, wherein calculating the score comprises using a weighted average of the two or more agent quality metrics, and wherein calculating at the system comprises calculating the score using the two or more agent quality metrics selected from a list consisting of: an historical applicant success rate of at least one previous admission applicant from the at least one agent, an historical program completion rate of the at least one previous admission applicant from the at least one agent, an historical program continuity rate of the at least one previous admission applicant from the at least one agent, a formal quality of at least one previous admission application from the at least one agent, an applicant English proficiency score reliability of the at least one previous admission application from the at least one agent, an admission applicant transcript reliability of the at least one previous admission application from the at least one agent, a measure of application completeness of the at least one previous admission application from the at least one agent, a total number of admission applicants corresponding to the at least one previous admission application from the at least one agent, at least one location of the at least one agent, a satisfaction rating of the at least one agent, and at least one certification of the at least one agent;
storing, in a database of the multi-institutional application system, the score;
anonymizing, by the multi-institutional application system, the score from the at least one educational institution;
sharing, by the multi-institutional application system and with computers of at least two educational institutions, the anonymized score to provide multi-institutional feedback;
taking an action, by the multi-institutional application system, relating to the score, wherein taking the action comprises performing a push-type action configured to automatically recalculate the score using at least one updated agent quality metric upon receiving at least one subsequent admission application from the at least one agent;
sending, from the multi-institutional application system and to at least one educational institution, the recalculated score;
providing, by the multi-institutional application system and to a computer of the at least one education institution, the recalculated score for display on a user interface;
tracking, by the database of the multi-institutional application system, applicant outcomes of the at least one admission application;
suggesting, based on the tracked applicant outcomes and by the multi-institutional application system, seat trades or exchanges between the at least two educational institutions to increase a likelihood of applicant enrollment at each of the at least two educational institutions; and
interfacing, by the multi-institutional application system, with a payment service to confirm payment status.

2. The computer-implemented method of claim 1, wherein taking the action comprises filtering the score to provide a subset of the information.

3. The computer-implemented method of claim 1, wherein calculating comprises determining whether the at least one agent quality a specified limit, and
wherein, if the at least one agent quality metric exceeds the specified limit, taking the action comprises flagging the at least one corresponding admission application and sending a notification to at least one recipient.

4. The computer-implemented method of claim 1, further comprising storing updated information with the recalculated scores using the agent quality metric in memory of the system.

5. The computer-implemented method of claim 1, wherein further comprises performing a pull-type action.

6. The computer-implemented method of claim 5, wherein performing the pull-type action enables a report to be created upon request.

7. A multi-institutional application system for evaluating agent quality of at least one agent of at least one admission applicant corresponding to at least one admission application, the multi-institutional application system configured to operate via a set of executable instructions storable in relation to a non-transient memory, the system comprising:
- a user interface at the multi-institutional application system for receiving information pertaining to the at least one admission application; and
- an admission system configured to receive the information from the user interface, the admission system communicating with the multi-institutional application system, the multi-institutional admission system running at least one service, the at least one service comprising an agent quality metric service, and the agent quality metric service configuring the multi-institutional admission system to:

receive, by the multi-institutional application system and from at least one agent, the at least one admission application;

store information, in the memory of the multi-institutional application system, pertaining to two or more agent quality metrics, in relation to the memory;

automatically calculating, by a processor of the multi-institutional application system, a score using the two or more agent quality metrics, wherein calculating the score comprises using a weighted average of the two or more agent quality metrics, and wherein calculating at the system comprises calculating the score using the two or more agent quality metrics selected from a list consisting of: an historical applicant success rate of at least one previous admission applicant from the at least one agent, an historical program completion rate of the at least one previous admission applicant from the at least one agent, an historical program continuity rate of the at least one previous admission applicant from the at least one agent, a formal quality of at least one previous admission application from the at least one agent, an applicant English proficiency score reliability of the at least one previous admission application from the at least one agent, an admission applicant transcript reliability of the at least one previous admission application from the at least one agent, a measure of application completeness of the at least one previous admission application from the at least one agent, a total number of admission applicants corresponding to the at least one previous admission application from the at least one agent, at least one location of the at least one agent, a satisfaction rating of the at least one agent, and at least one certification of the at least one agent;

storing, in a database of the multi-institutional application system, the score;

anonymizing, by the multi-institutional application system, the score from the at least one educational institution;

sharing, by the multi-institutional application system and with computers of at least two educational institutions, the anonymized score to provide multi-institutional feedback;

take an action, by the multi-institutional application system, relating to the score, wherein taking the action comprises performing a push-type action configured to automatically recalculate the score using at least one updated agent quality metric upon receiving at least one subsequent admission application from the at least one agent;

send, from the multi-institutional application system and to at least one educational institution, the recalculated score;

providing, by the multi-institutional application system and to a computer of the at least one education institution, the recalculated score for display on a user interface;

tracking, by the database of the multi-institutional application system, applicant outcomes of the at least one admission application;

suggesting, based on the tracked applicant outcomes and by the multi-institutional application system, seat trades or exchanges between the at least two educational institutions to increase a likelihood of applicant enrollment at each of the at least two educational institutions; and interfacing, by the multi-institutional application system, with a payment service to confirm payment status.

8. The system of claim 7, wherein the user interface is presented on one of a web browser and a mobile device.

9. The system of claim 7, wherein the admission system comprises an admission web portal, an application server, and a database.

10. The system of claim 7, wherein the educational institution application system comprises a web portal and a database.

11. The system of claim 7, wherein the at least one service further comprises an email service and a notification service.

* * * * *